US010328787B2

(12) United States Patent
Scholle et al.

(10) Patent No.: US 10,328,787 B2
(45) Date of Patent: Jun. 25, 2019

(54) DRIVE DEVICE FOR A HYBRID-DRIVE MOTOR VEHICLE

(71) Applicant: AUDI AG, Ingolstadt (DE)

(72) Inventors: Tassilo Scholle, Ingolstadt (DE); Christian Wirth, Moosinning / Eichenried (DE); Simon Brummer, Gröbenzell (DE)

(73) Assignee: AUDI AG, Ingolstadt (DE)

( * ) Notice: Subject to any disclaimer, the term of this patent is extended or adjusted under 35 U.S.C. 154(b) by 58 days.

(21) Appl. No.: 15/535,152

(22) PCT Filed: Dec. 11, 2015

(86) PCT No.: PCT/EP2015/079473
§ 371 (c)(1),
(2) Date: Jun. 12, 2017

(87) PCT Pub. No.: WO2016/092089
PCT Pub. Date: Jun. 16, 2016

(65) Prior Publication Data
US 2017/0341502 A1  Nov. 30, 2017

(30) Foreign Application Priority Data

Dec. 12, 2014 (DE) .................. 10 2014 018 463

(51) Int. Cl.
| | |
|---|---|
| *B60K 6/54* | (2007.10) |
| *B60K 6/543* | (2007.10) |
| *B60K 6/365* | (2007.10) |
| *B60K 6/547* | (2007.10) |
| *F16H 3/72* | (2006.01) |
| *B60K 6/48* | (2007.10) |
| *B60K 6/52* | (2007.10) |
| *F16H 3/66* | (2006.01) |
| *F16H 37/08* | (2006.01) |

(52) U.S. Cl.
CPC .............. *B60K 6/543* (2013.01); *B60K 6/365* (2013.01); *B60K 6/48* (2013.01); *B60K 6/52* (2013.01);
(Continued)

(58) Field of Classification Search
None
See application file for complete search history.

(56) References Cited

U.S. PATENT DOCUMENTS

| | | | |
|---|---|---|---|
| 7,387,585 B2 * | 6/2008 | Bucknor | ................ B60K 6/365 180/65.235 |
| 8,905,892 B1 | 12/2014 | Lee et al. | |
| 9,517,688 B2 * | 12/2016 | Hwang | .................. B60K 6/365 |

FOREIGN PATENT DOCUMENTS

| | | |
|---|---|---|
| AT | 513538 A1 | 5/2014 |
| CN | 101000084 A | 7/2007 |

(Continued)

OTHER PUBLICATIONS

Examination Report dated Oct. 30, 2015 of corresponding German application No. 102014018463.3; 8 pgs.
(Continued)

*Primary Examiner* — Dirk Wright
(74) *Attorney, Agent, or Firm* — Maier & Maier, PLLC

(57) ABSTRACT

A drive device for a hybrid-drive motor vehicle, having an internal combustion engine as a primary drive, an electric engine as a secondary drive, and having planetary gear units that are coupled with one another that can be shifted into different gear steps through shift elements and brakes. The planetary gear units being connectable to a common output shaft by way of input elements and output elements. The reaction elements thereof can be coupled or firmly braked, wherein the drive device can be operated in an electromotor drive, a primary drive having gear steps (gears), or in a hybrid drive.

13 Claims, 5 Drawing Sheets

(52) U.S. Cl.
CPC ............... *B60K 6/547* (2013.01); *F16H 3/66* (2013.01); *F16H 3/725* (2013.01); *F16H 37/0806* (2013.01); *B60K 2006/4816* (2013.01); *B60K 2006/4833* (2013.01); *B60Y 2200/92* (2013.01); *F16H 2200/0017* (2013.01); *F16H 2200/0052* (2013.01); *F16H 2200/2007* (2013.01); *F16H 2200/2041* (2013.01); *Y02T 10/6217* (2013.01); *Y02T 10/6256* (2013.01); *Y10S 903/911* (2013.01); *Y10S 903/916* (2013.01); *Y10S 903/918* (2013.01); *Y10S 903/919* (2013.01)

(56) References Cited

FOREIGN PATENT DOCUMENTS

| CN | 102152734 A | 8/2011 |
|---|---|---|
| CN | 102348567 A | 2/2012 |
| CN | 104057815 A | 9/2014 |
| DE | 10 2006 060 402 A1 | 7/2007 |
| DE | 11 2008 000 777 T5 | 4/2010 |
| DE | 10 2011 003 830 A1 | 8/2012 |
| DE | 10 2012 024 218 A1 | 6/2014 |
| DE | 10 2013 006 030 A1 | 10/2014 |
| WO | 2014/040689 A1 | 3/2014 |

OTHER PUBLICATIONS

International Search Report (with English translation) and Written Opinion dated Feb. 23, 2016 of corresponding International application No. PCT/EP2015/079473; 18 pgs.

English translation of the International Preliminary Report on Patentability dated Jun. 22, 2017 issued in corresponding International Application No. PCT/EP2015/079473; 9 pgs.

Office Action dated Jul. 10, 2018 in corresponding German Application No. 10 2014 018 463.3; 7 pages.

Chinese Office Action dated Oct. 24, 2018, in connection with corresponding CN Application No. 201580067567.3 (26 pgs., including machine-generated English translation).

\* cited by examiner

| Gear | Shift elements | | | | | Remarks |
|------|----|----|----|----|----|---------|
|      | K0 | B1 | K1 | K2 | K3 |         |
| V1   | X  | X  | X  |    |    |         |
| V2   | X  |    | X  | X  |    |         |
| V3   | X  |    | X  |    |    | CVT1    |
| V4   | X  |    | X  |    | X  |         |
| V5   | X  |    |    |    | X  | CVT2    |
| V6   | X  |    |    | X  | X  |         |
| E1   |    | X  | (X)|    | (X)|         |
| E2a  |    |    | (X)| X  |    |         |
| E2b  |    |    |    | X  | (X)|         |
| E3   |    |    | X  |    | X  |         |

Fig. 2

DRIVE DEVICE FOR A HYBRID-DRIVE MOTOR VEHICLE

FIELD

The present invention relates to a drive device for a hybrid-drive motor vehicle.

BACKGROUND

AT 51 35 38 A1 describes a generic drive device for a hybrid-drive motor vehicle, in which an internal combustion engine and an electric engine drive off a common transmission, in which the transmission is formed by a planetary gear set designed as a minus transmission and a Ravigneaux gear set coupled thereto by way of clutches and brakes. The drive device can be operated in combustion engines and electric engines in three gear steps (gears) and in the hybrid drive, power-split into two continuous transmission ranges.

SUMMARY OF THE DISCLOSURE

The object of the invention is to provide a drive device by means of which different drive modes can be controlled to an increased extent and which is advantageously designed in terms of structure and efficiency.

According to the invention, it is proposed that up to six gear steps (V1 to V6) can be shifted into in the primary drive, and that a stepless drive (CVT1, CVT2) can be controlled, at least in two gear steps, via the electric engine EM by generator or motor superposition in the planetary gear units. In addition to the known drive modes, a further driving mode is thus created with which a stepless operation of the motor vehicle in the primary drive can be controlled. This is particularly advantageous for reasons of efficiency and/or comfort. When the planetary gear unit is appropriately connected, apart from the activation of the electric engine, no substantial, additional design expenditure is required. For example, a stepless driving operation can be controlled in which the start-up ratio is very low due to negative rotational speed of the electric engine, increases through rotational speed 0, and is steplessly controlled into a start-up high gear ratio (CVT1) by positive speed control of the electric engine. The same applies, for example, to a second, higher transmission range (CVT2), which is steplessly controllable in the transmission range from a 4th gear up to a 6th gear. Thus, targeted settings of load points are possible on the internal combustion engine and/or on the electric engine, for example, combined with improved driving dynamics of the motor vehicle, as a function of present and/or predetermined operating parameters.

Furthermore, in the primary drive, fixed transmission ratios can also be controlled through firm braking of the electric engine for example, in order, to keep defined operating points of the internal combustion engine in the stepless operating range.

With the secondary drive, three gears that are independent of the primary drive can be shifted into. In doing so, at least one gear can be used as a start-up gear.

In an advantageous enhancement of the invention, it is proposed that the drive device is formed by an at least two-shaft transmission with two three-shaft planetary gear units, by means of which the driving modes can be realized with relatively low transmission engineering effort.

A particularly preferred design of the drive device is achieved in that the internal combustion engine is operatively connected to two planetary gear units coupled to one another and mounted parallel to the axle by way of a first input shaft and a first spur gear drive, and the electric engine is operatively connected to the planetary gear units by way of a second input shaft parallel to the axle, wherein an output element of the planetary gear units is connected to the common output shaft.

In this case, the six forward gears of the internal combustion engine operation and three forward gears (E1 to E3) in the electric engine operation can be shifted into, from a design and control technology perspective, particularly advantageously by way of only three clutches and a brake. The clutches may preferably be hydraulically controlled disc clutches, but may optionally also be formed by form-fitting dog clutches. The same thing applies to the technical design of the brake.

In a structurally simple, compact design, the output shaft is securely operatively connected directly or indirectly to the two planet carriers, which are in each case the total shaft of the planetary gear unit, as output elements of the planetary gear unit. Furthermore, the sun gear of the second planetary gear unit can be coupled to the outer gear of the first planetary gear unit via the clutch K1 while the outer gear of the second planetary gear unit is directly coupled to the input shaft of the internal combustion engine via a second spur gear drive.

In another embodiment of the invention, which is advantageous from a design and spatial perspective, the outer gear of the first planetary gear unit can be firmly braked by way of the brake B1 or can be coupled with the first spur gear drive of the drive device by way of the clutch K3. Furthermore, the sun gear of the first planetary gear unit is operatively connected directly or indirectly to the electric engine (EM) via the input shaft and can also be coupled to the planet carrier via a clutch K2 between the input shaft and the planet carrier.

Finally, in an especially preferred connection of the transmission elements of the two planetary gear units, the sun gear of the first planetary gear unit can be operatively connected directly or indirectly to the electric engine via the corresponding input shaft and can also be coupled to the planet carrier via a clutch K2 between the input shaft and the planet carrier.

Furthermore, the electric engine can be connected to the corresponding input shaft either directly or indirectly by way of another spur gear drive, for reasons relating to space and/or transmission ratios.

As an alternative to a conventional electric engine, the engine can be arranged in the shape of a ring and radially around the two planetary gear units, wherein the rotor thereof directly drives off the input shaft of the first planetary gear unit by way of a flange connection. This results in a structurally particularly short, very compact design of the drive device.

Furthermore, the internal combustion engine can be operatively connected, in a known manner, to the transmission input shaft by way of a start-up clutch K0 and optionally by way of a torsional vibration damper. The clutches K0, K3 and the brake B1 may also be positioned, advantageously from a structural perspective, on one side of the two planetary gear units and the clutch K2 can be positioned on the other side.

Finally, in order to achieve an all-wheel drive of the motor vehicle, the output shaft of the drive device can be designed as a hollow shaft, which drives off an inter-axle differential (MD), the output shafts of which can be operatively connected to a front and a rear axle differential of the motor vehicle.

BRIEF DESCRIPTION OF THE DRAWINGS

Several exemplary embodiments of the invention are explained in more detail in the following based on the accompanying drawing. The following is shown:

FIG. 2 shows a shifting matrix for the drive device, which can be shifted into up to six internal combustion engine forward gears as well as three electric gears, wherein two of the internal combustion engine gears can be controlled steplessly;

DETAILED DESCRIPTION

Figure 1:
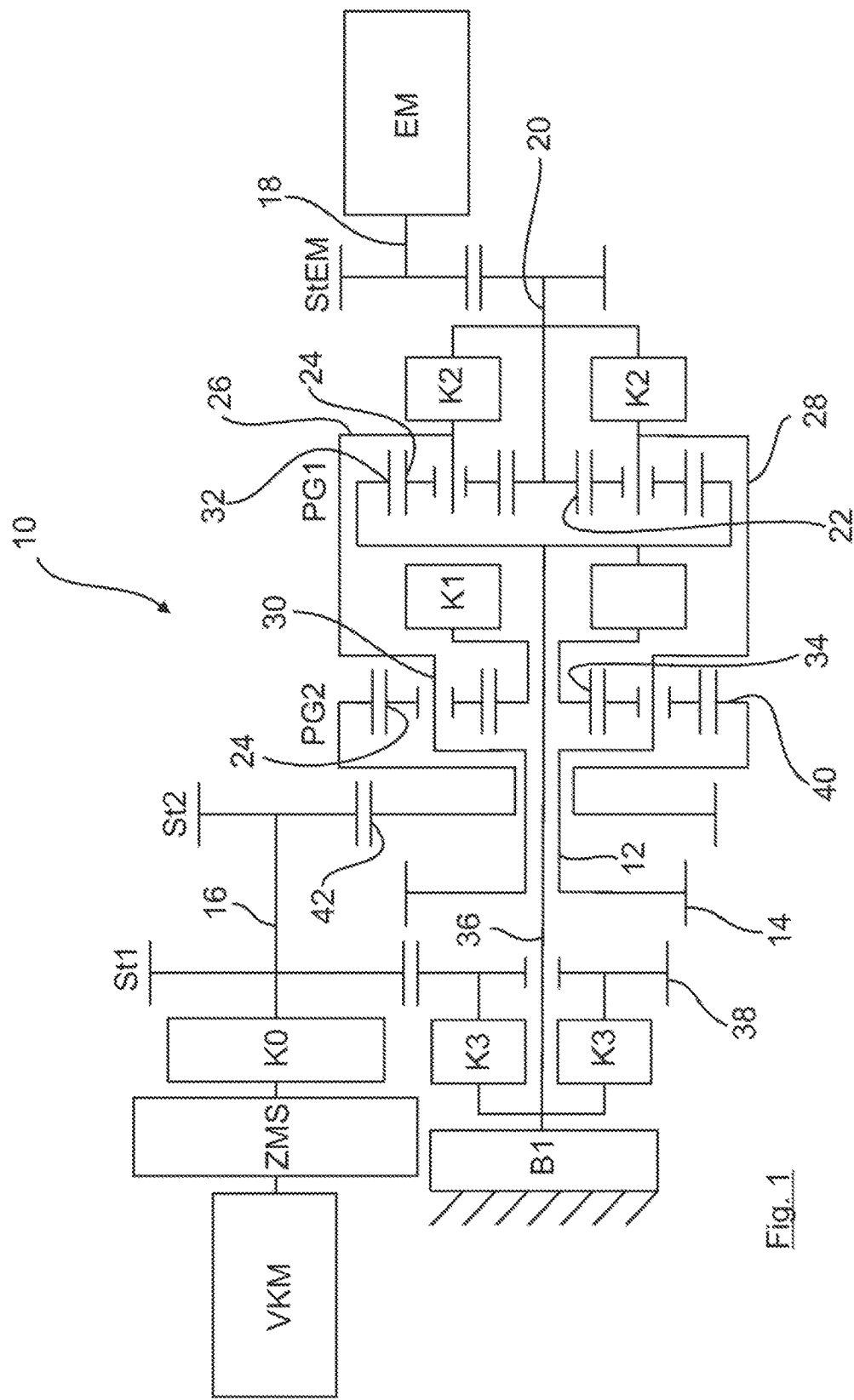
FIG. 1 shows a schematic block diagram of a hybrid drive device for motor vehicles having an internal combustion engine and an electric engine, which drive off a common output shaft by way of two planetary gear units arranged parallel to the axle and coupled to one another.

The drive device 10 shown in FIG. 1 for a hybrid-drive motor vehicle has an internal combustion engine VKM, on one hand, and an electric engine EM, on the other hand, as drive sources, which can be activated separately or jointly, and which drive off a common output shaft 12 by way of two simple planetary gear units, PG1 and PG2. The other drive train for driving, for example, the front wheels of the motor vehicle may be of a known type and is therefore not shown in further detail.

The internal combustion engine acts upon an input shaft 16 by way of a torsional vibration damper (for example, a dual mass flywheel ZMS) and by way of a start-up clutch K0.

The input shaft 16 is operatively connected, in a manner yet to be described, to the two three-shaft planetary gear units PG1, PG2 mounted parallel to the axle in a gearbox housing, which is not shown, by means of a first spur gear drive ST1, via the clutch K3.

Figure 3:
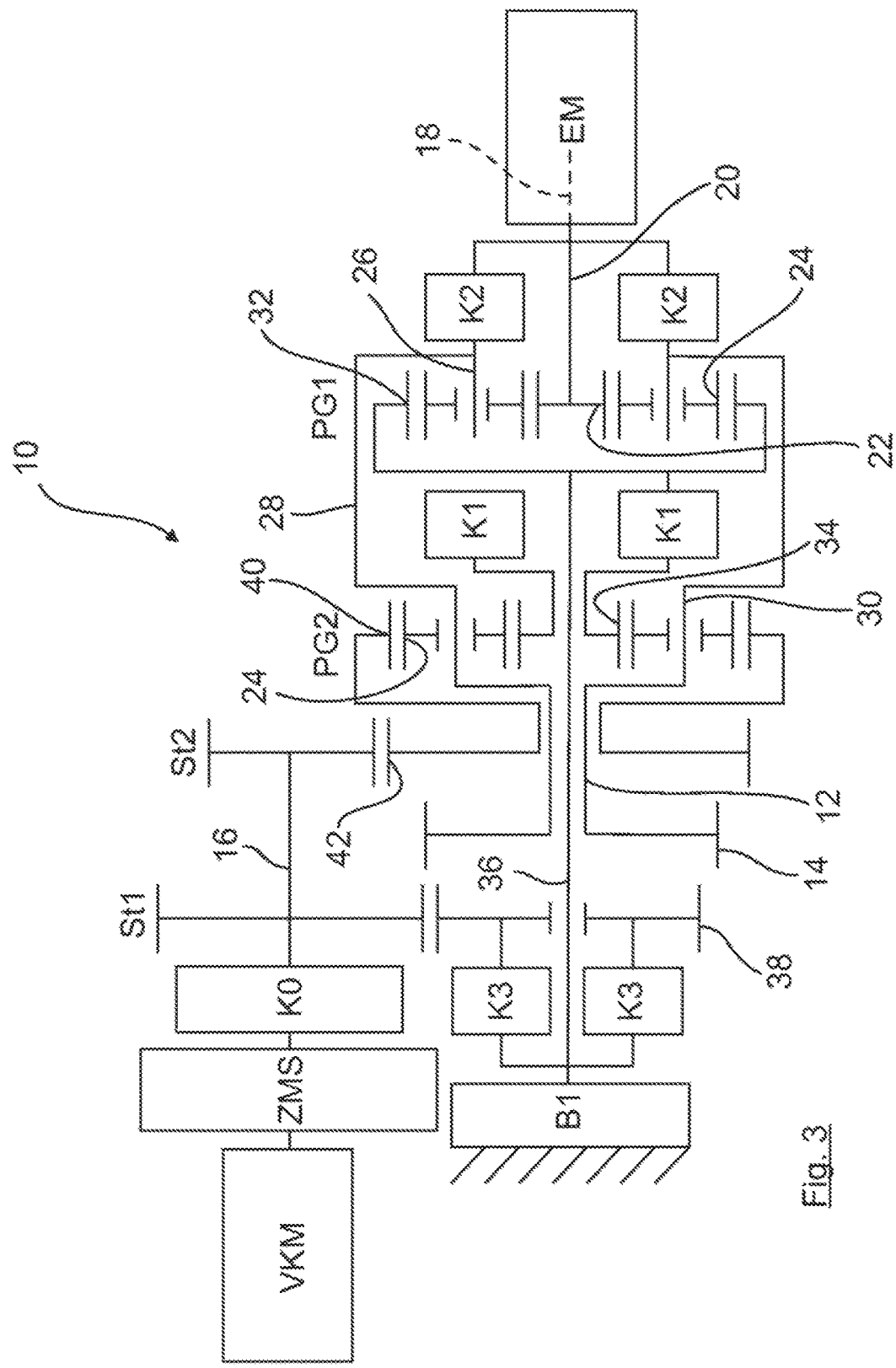
FIG. 3 shows a drive device according to FIG. 1, in which the electric engine is connected directly to the planetary gear unit.

The electric engine EM positioned parallel to the axle with respect to the output shaft 12 drives off the two planetary gear units PG1, PG2 by way of its output shaft 18, a third spur gear set StEM, and a second input shaft 20. Alternatively, the EM may also be driven directly off the input shaft 20 (FIG. 3).

The planetary gear units PG1, PG2, driven by the internal combustion engine via the spur gear drive St1 and a second spur gear drive St2, are coupled to one another as follows:

The input shaft 20 driven by the EM is connected to the sun gear 22 of the planetary gear unit PG1 and can be coupled to the planet carrier 26 of the PG1 supporting planetary gears 24 by means of the clutch K2.

The planet carrier 26 is securely connected to planet carrier 30, which is likewise supporting planetary gears 24, of axially directly adjacent planetary gear unit PG2, by way of a drive connection 28, and it is connected to the output shaft 12 designed as a hollow shaft.

Furthermore, the outer gear 32, engaging with the planetary gears 24, of the planetary gear unit PG1 can be connected to the sun gear 34 of the planetary gear unit PG2 via the integrated clutch K1. The outer gear 32 can be additionally firmly braked by way of a brake B1 provided in the gearbox housing via a center shaft 36 or can be coupled with the driven gear wheel 38 of the first spur gear drive St1 via the clutch K3.

Finally, the outer gear 40 of the planetary gear unit PG2 can be securely connected to the driven gear wheel 42 of the spur gear drive St2.

The clutches K0, K1, K2, K3 and the brake B1 are preferably designed as friction clutches or disk clutches; alternatively, at least the shift elements K3, B1 can also be effectively designed in a positive-locking manner.

FIG. 2 shows an exemplary shifting matrix for shifting the gear steps or gears of the drive device 10; the Xs indicate the respectively shifted or activated shift elements K0, B1, K1, K2, K3. The possible forward gears for the internal combustion engine VKM are indicated by V1 to V6 and those for the electric engine EM are indicated by E1 to E3. The Xs in parentheses are alternatively possible connection options.

The "Remarks" column states the shifting states in which the drive device can be additionally operated in the stepless range (CVT1, CVT2) with the electric engine EM controllably coupled thereto.

The drive device 10 may accordingly be operated with the internal combustion engine VKM in the gears V1 to V6. The electric engine EM may be in idle as a generator for producing current or, however, for example, together in a boost mode with the internal combustion engine VKM, drive the motor vehicle.

Furthermore, the electric engine EM can drive the motor vehicle separately in the gears E1 to E3 (E2a and E2b can have the same transmission ratio), wherein the internal combustion engine VKM here is disconnected by way of the disengaged start-up clutch K0.

In the gears V3 and/or V5, through corresponding activation of the electric engine EM, the latter can be operated either as a generator or as the drive motor, superposing planetary gear units PG1, PG2, and/or the shifted gears, as follows:

| In V3: (CVT1) | |
| --- | --- |
| Negative rotational speed of the electric engine (Generator operation) | -> Start-up (geared neutral) |
| Rotational speed of electric engine = 0 | -> 3rd gear |
| Positive rotational speed of electric engine (Engine operation) | -> Up to gear ratio 4th gear |
| In V5: (CVT2) | |
| Positive rotational speed of electric engine (Generator operation) | -> Gear ratio $4^{th}$ gear and above |
| Rotational speed of electric engine = 0 | -> 5th gear |
| Negative rotational speed of electric engine (Engine operation) | -> Up to gear ratio 6th gear |

In electric engine operation, there can additionally be at least a shift into a reverse gear R by reversing the rotational direction of the electric engine EM.

The driving speed can be used to shift into gears E1 to E3 of the electric engine EM or gears V1 to V6 according to the matrix in FIG. 2. Furthermore, the previously listed CVT1, CVT2 driving ranges can be steplessly covered as gears 1 to 6 in V3 and V5 as shown.

The gear changes may optionally also be synchronized in superposition operation by way of the EM, whereby at least clutches K1 to K3 and brake B1 may be positive-locking clutch elements (dog clutches) with a corresponding transmission control design.

Figure 4:
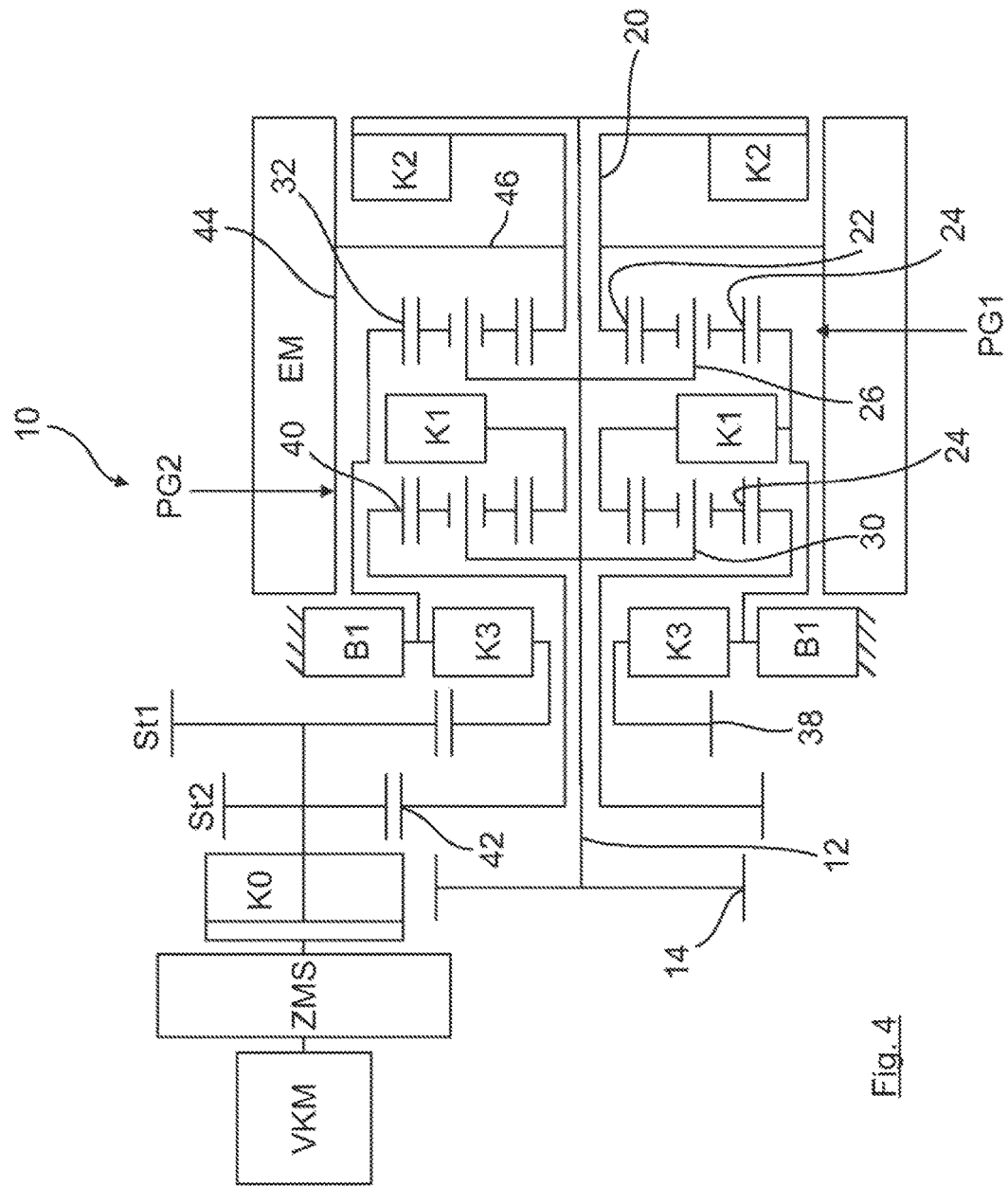
FIG. 4 shows a drive device as an alternative to FIGS. 1 and 3, in which the electric engine is arranged annularly around the planetary gear units.

FIG. 4 shows a drive device 10 as an alternative to FIG. 1, which is only described to the extent that it essentially differs from FIG. 1 and/or FIG. 3. Functionally equivalent parts are provided with the same reference characters.

According to FIG. 4, an electric engine EM designed in the shape of a ring is arranged coaxially with respect to planetary gear units PG1, PG2 and radially around them, wherein the rotor 44 thereof drives directly off the input shaft 20 by way of a connecting flange 46.

The input shaft 20 formed as a hollow shaft here, as previously, is securely connected to the sun gear 22 of the planetary gear unit PG1 and can be coupled to the two planet carriers 26, 30 of the planetary gear units PG1, PG2 and the output shaft 12, which is center here, by way of the clutch K2.

The connection of the transmission elements to clutches K1, K2, K3 and brake B1 are as stated previously regarding FIG. 1, wherein, however, the spur gear drives St1, St2 are reversed and the arrangement of the clutches and the brake are changed in their position and connection, as shown. The shifting matrix according to FIG. 2 can be applied similarly.

Figure 5:
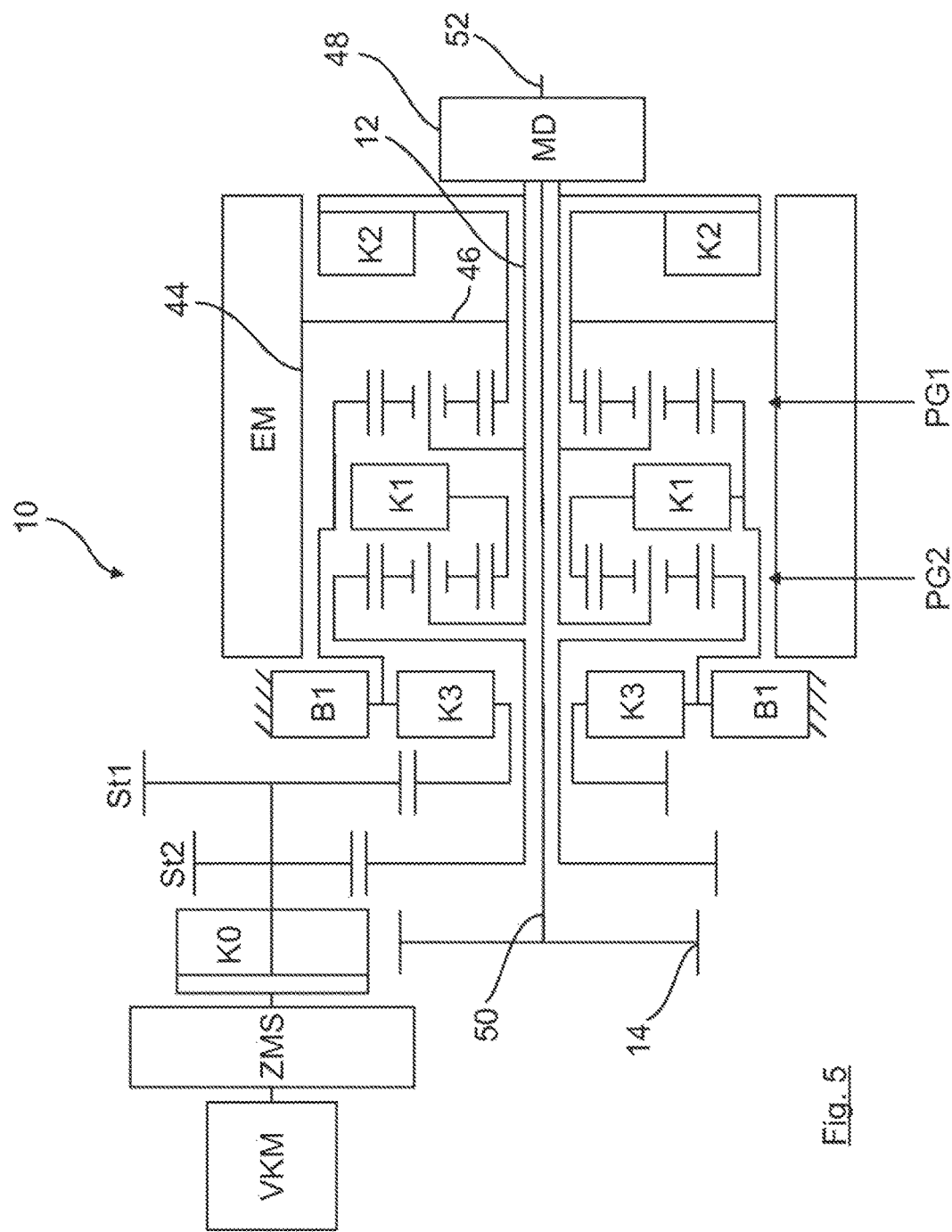
FIG. 5 shows a drive device for all-wheel-drive motor vehicles as an alternative to FIG. 4 having an integrated center differential and two transmission output shafts.

Finally, FIG. 5 shows a drive device 10 for an all-wheel-drive motor vehicle, which is essentially equivalently designed to that in FIG. 4; only the relevant differences with respect to the transmission are illustrated. Functionally equivalent parts are provided with the same reference characters.

According to FIG. 5, the output shaft 12 is designed as a hollow shaft, which drives off the differential casing 48 of an inter-axle differential (or center differential) MD. The differential MD may be, for example, a bevel gear differential of a known type or another known differential.

The output half-shafts 50, 52 of the differential MD can then be operatively connected (not shown) with a front and a rear axle differential of the motor vehicle. As can be seen, the transmission elements and the output shaft 12 are routed through the one, central output shaft 50. Moreover, the drive device 10 is designed according to the drive device 10 in FIG. 4 (or optionally also according to FIG. 1).

The described drive devices 10 enable universal drive modes for operating a motor vehicle, especially, namely, electric, internal combustion, hybrid, and optionally in CVT mode for reasons of, for example, efficiency and comfort. In CVT mode, any desired number of gear ratios can be programmed that can be controlled, depending on load requirements and efficiency-advantageous settings, in addition to a stepless transmission control.

Through firm braking of the electric engine EM (by means of a brake or generator), fixed transmission ratios can also be controlled in an additional driving mode as needed by way of the internal combustion engine VKM.

The invention claimed is:

1. A drive device for a hybrid-drive motor vehicle, comprising:
    an internal combustion engine, the internal combustion engine is a primary drive,
    an electric engine, the electric engine is a secondary drive, and
    planetary gear units coupled with one another that are shifted into different gear steps through clutches and brakes, said gear units being connected to a common output shaft by way of input elements and output elements and reaction elements thereof are coupled or firmly braked,
    wherein the drive device is operated in an electromotor drive, a primary drive having gear steps, or in a hybrid drive,
    wherein six gear steps are shifted into in the primary drive,
    wherein a stepless drive mode is controlled, at least in two gear steps, through the electric engine by a generator or motor superposition in the planetary gear units, and
    wherein, with the secondary drive, three gear steps that are independent of the primary drive are shifted into, and at least one of the three gear steps that are shiftable independently of the primary drive is usable as a start-up gear.

2. The drive device according to claim 1, wherein one or more fixed transmission ratios are also controllable in the primary drive through braking of the electric engine.

3. The drive device according to claim 1, wherein an at least two-shaft transmission with two three-shaft planetary gear units is provided, and the shafts are coupled to the two three-shaft planetary gear units.

4. The drive device according to claim 1, wherein the internal combustion engine is operatively connected to the planetary gear units mounted parallel to an axle and coupled to one another, by way of a first input shaft and a first spur gear drive, and the electric engine is operatively connected to the planetary gear units by way of a second input shaft parallel to the axle, wherein an output element of the planetary gear units is connected to a common output shaft.

5. The drive device according to claim 4, wherein the six gears of the internal combustion engine operation and three forward gears in the electric engine operation shifted by way of three clutches and one brake.

6. The drive device according to claim 5, wherein the output shaft is indirectly or directly connected to two planet carriers as output elements of the planetary gear units.

7. The drive device according to claim 6, wherein a sun gear of the second planetary gear unit coupled to an outer gear of the first planetary gear unit by way of one of the clutches.

8. The drive device according to claim 6, wherein an outer gear of the second planetary gear unit is directly coupled to an input shaft of the internal combustion engine by way of a second spur gear drive.

9. The drive device according to claim 7, wherein the outer gear of the first planetary gear unit is firmly braked by way of a brake or coupled to the first spur gear drive by way of one of the clutches.

10. The drive device according to claim 6, wherein a sun gear of the first planetary gear unit is indirectly or directly connected to the electric engine by way of the second input shaft.

11. The drive device according to claim 10, wherein the sun gear of the first planetary gear unit is coupled to the planet carrier by way of a clutch between the second input shaft and the planet carrier.

12. The drive device according to claim 10, wherein the electric engine is connected to the second input shaft by way of another spur gear drive.

13. The drive device according to claim 4, wherein the internal combustion engine is operatively connected to the first input shaft by way of a start-up clutch and by way of a torsional vibration damper.

* * * * *